No. 33,510. S. W. BAKER. PATENTED OCT. 22, 1861.
LAPPING.
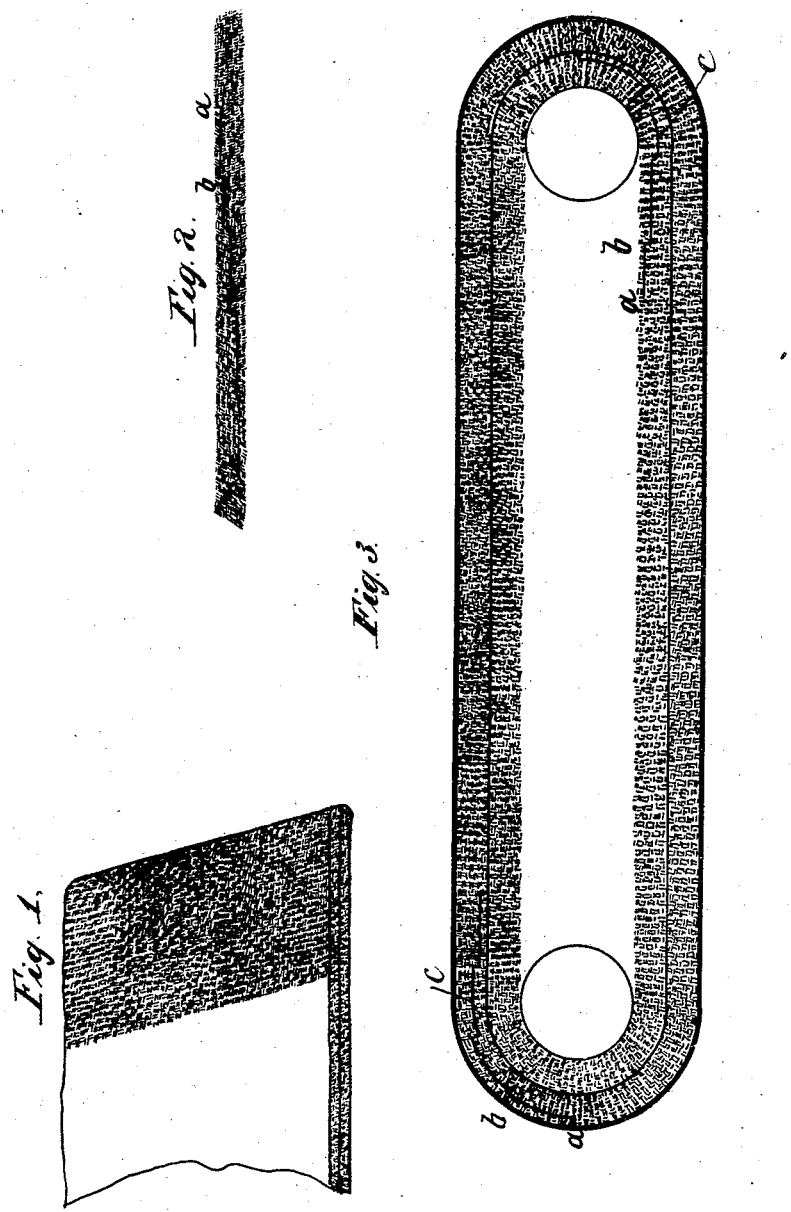

UNITED STATES PATENT OFFICE.

SETH W. BAKER, OF PROVIDENCE, RHODE ISLAND.

IMPROVEMENT IN WOVEN ENDLESS BELTS.

Specification forming part of Letters Patent No. 33,510, dated October 22, 1861.

*To all whom it may concern:*

Be it known that I, SETH W. BAKER, of Providence, in the county of Providence and State of Rhode Island, have invented certain new and useful Improvements in the Manufacture of Endless Belts, Lapping, &c.; and I do hereby declare that the following description, taken in connection with the accompanying drawings hereinafter referred to, forms a full and exact specification of the same, wherein I have set forth the nature and principles of my said improvements, by which my invention may be distinguished from all others of a similar class, together with such parts as I claim and desire to have secured to me by Letters Patent.

The figures of the accompanying plate of drawings represent my improvements.

Figure 1 is a perspective view. Fig. 2 is a section, longitudinal, through one joint. Fig. 3 is a sectional view showing my improvements, &c.

My improvements are made upon a kind of machine belts or bands which are composed of a thick fabric composed of several thicknesses woven into one, as hereinafter described, whether coated or not with india-rubber, gutta-percha, &c. This "solid belting," as it is termed, has of late been extensively used, particularly on account of the great strength it affords; but a difficulty has been experienced in uniting the ends of so thick a fabric in order to form it into an endless belt or band, as if the ends are lapped one over the other too clumsy a joint or seam is produced to allow of its smooth running over pulleys, and if the ends are simply butted together they soon pull apart and require frequent tightening.

By the present invention the ends of a thick woven fabric can be so united to each other as to form a smooth, even, and strong joint without any perceptible seam or break, whereby it can be adapted to the making of endless bands for machinery to a new lapping used in machines for printing textile fabrics, for which I have made application for separate Letters Patents and to various other useful purposes.

The mode by which my invention may be practically carried into effect I will next proceed to describe in detail. The woven fabric which I prefer to use is that made under the Letters Patent of the United States granted to John Gujer, bearing date May 18, 1858, and numbered 20,267, and fully described in the schedule annexed to the same. The band or belt may be formed of one thick fabric, or may consist of two or more thicknesses united by rubber or other cement or by a thin sheet of rubber or gutta-percha. One or both of its surfaces and its edges (with the exception of the portions that are to form the joint, as will be hereinafter explained) may be covered or coated with india-rubber or gutta-percha in order to form a smooth running surface in any proper manner. The ends of the belt are then united, so as to make a strong lap without any perceptible seam or joint, as follows: I take such a woven fabric as is composed of several tiers of filling-threads interwoven with the warp-threads. I then cut a sufficient number of the warp-threads to liberate the first tier of filling-threads, being the portion that is to form the length of the lap or joint. This reduces the fabric the thickness of one set of filling-threads. Then at any suitable distance from the edge $a$ $a$, Figs. 2 and 3, thus formed on the fabric—say one inch—the whole remaining surface is thinned by the removal of another or second tier of filling-threads, which forms a second edge, $b$ $b$, Figs. 2 and 3. The remaining surface is then reduced in a similar manner by taking out the third tier of filling-threads, and this may be continued at pleasure until the fabric is brought down to its thinnest edge or so as to leave an edge composed of but one tier of filling-threads interwoven with the warp. Two beveled or scarped laps thus made are then put together by means of rubber or other cement, by sewing, or in any other suitable manner, and form a lap-joint $c$ $c$, Figs. 2 and 3, of great strength and showing no perceptible seam.

I would here observe that I do not confine myself to the adaptation of this my invention to the manufacture of endless lapping or belts or to the formation of endless fabrics whatever their adaptation may be. In many instances it is important to unite the ends of certain fabrics for the purpose of merely increasing the length or width of the material without forming a seam or ridge at the juncture of the parts.

Having thus described my invention and the manner in which the same is or may be carried into effect, I shall state my claim as follows:

The mode herein described of forming and uniting the ends of belts or bands or of other thick material composed of thick woven fabric, as herein specified, whereby they present when finished no perceptible seam at their lap or juncture.

S. W. BAKER.

Witnesses:
 JOSEPH GAVETT,
 ALBERT W. BROWN.